US012608781B2

(12) United States Patent
Seeger

(10) Patent No.: US 12,608,781 B2
(45) Date of Patent: Apr. 21, 2026

(54) DYNAMIC TONE-MAPPING SYSTEM NORMALIZED AROUND REFERENCE WHITE

(71) Applicant: NBCUniversal Media, LLC, New York, NY (US)

(72) Inventor: Arley Christopher Seeger, Rockville Centre, NY (US)

(73) Assignee: NBCUniversal Media, LLC, New York, NY (US)

( * ) Notice: Subject to any disclaimer, the term of this patent is extended or adjusted under 35 U.S.C. 154(b) by 536 days.

(21) Appl. No.: 18/076,140

(22) Filed: Dec. 6, 2022

(65) Prior Publication Data

US 2024/0029219 A1     Jan. 25, 2024

Related U.S. Application Data

(60) Provisional application No. 63/392,026, filed on Jul. 25, 2022.

(51) Int. Cl.
*G06T 5/92*          (2024.01)
*G06T 9/00*          (2006.01)

(52) U.S. Cl.
CPC ................ *G06T 5/92* (2024.01); *G06T 9/00* (2013.01); *G06T 2207/20208* (2013.01)

(58) Field of Classification Search
CPC .... G06T 5/92; G06T 9/00; G06T 2207/20208
See application file for complete search history.

(56) References Cited

U.S. PATENT DOCUMENTS

| | | | |
|---|---|---|---|
| 8,050,512 B2 | 11/2011 | Daly et al. | |
| 2018/0336669 A1* | 11/2018 | Mertens | ................. H04N 5/445 |
| 2023/0057829 A1* | 2/2023 | Chen | ........................ G06T 5/92 |
| 2024/0354916 A1* | 10/2024 | Van Der Vleuten | ........................ |
| | | | G11B 27/105 |
| 2025/0005725 A1* | 1/2025 | Touze | ....................... G06T 5/92 |

FOREIGN PATENT DOCUMENTS

WO          2021175633 A1      9/2021

OTHER PUBLICATIONS

Meylan, Laurence et al.; "Tone Mapping for High Dynamic Range Displays"; Sharp Laboratories of America, Camas, WA; 12 pages.

* cited by examiner

*Primary Examiner* — John B Strege
*Assistant Examiner* — Daniel C Chang
(74) *Attorney, Agent, or Firm* — Fletcher Yoder, P.C.

(57)     ABSTRACT

A dynamic and selective tone mapping system that receives digital imagery content and adjusts the digital imagery content using defined perceptual point parameters that correspond to particular luminance points or regions of the digital imagery content. The defined perceptual point parameters include a first white reference value, wherein the tone mapping system adjusts the digital imagery content by compressing luminance values above the first white reference value at different compression rates to produce digital imagery content that is compatible with various media viewing devices with varying display brightness capabilities while preserving influence over the intended look of the displayed image resulting from the digital imagery content.

20 Claims, 7 Drawing Sheets

DYNAMIC TONE-MAPPING SYSTEM NORMALIZED AROUND REFERENCE WHITE

CROSS-REFERENCE TO RELATED APPLICATION

This application claims priority to and the benefit of U.S. Provisional Application No. 63/392,026, entitled "DYNAMIC TONE-MAPPING SYSTEM NORMALIZED AROUND REFERENCE WHITE" and filed Jul. 25, 2022, which is incorporated by reference herein in its entirety for all purposes.

BACKGROUND

The present disclosure relates generally to the field of digital content delivery, and more particularly to systems and methods for dynamic tone-mapping system normalized around reference white for high-dynamic range (HDR) and standard-dynamic range (SDR) content which will be displayed on various media viewing devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various consumer media viewing devices, such as televisions, projectors, computers, and handheld devices (e.g., cellular telephones, audio and video players, gaming systems), are configured to display digital content received from one or more content providers. The digital content transmitted may be in the form of SDR or HDR imagery content (e.g., SDR or HDR imagery video). SDR imagery content may have a limited dynamic range as it may be based on cathode ray tube (CRT) display technology. A luminance range for SDR imagery content may vary depending on desired look of the content and/or display capabilities of a consumer media viewing devices (e.g., scene-referred, display-referred). For example, peak brightness of SDR imagery content may be displayed with a range from approximately 100-500 nits. A program mastering monitor might have a luminance level of 100-203 nits (BT.1886/BT.2129), where nits are units of luminance (1 nit is defined as 1 candela/square meter). Whereas HDR imagery content may include a relatively higher level of contrast between light and dark images (e.g., large luminance range) than SDR imagery content. For example, the peak-brightness of HDR imagery content may range from approximately 400 nits to upwards of 10,000 nits. Accordingly, HDR imagery content may include imagery that more closely resembles colors and brightness as seen in real life, thereby providing consumers with a more realistic viewing experience. Consumers may select SDR and/or HDR imagery content from one or more digital content providers and receive SDR and/or HDR imagery content on their media viewing devices.

Traditionally, consumer media viewing devices have used inconsistent image processing techniques across product lines and/or device manufactures, which results in an inconsistent display of SDR and/or HDR imagery across various media viewing devices. For example, different consumer media viewing devices, based upon their particular image processing logic, may provide images that are vastly brighter, vastly darker, and/or that have different variations in the display of highlight regions (e.g., clipping highlights) and/or dark regions, etc. when compared with other consumer media viewing devices. This may provide drastically different and/or unpredictable viewing experiences among consumers using different consumer media viewing devices.

Some conventional media viewing devices may utilize tone mapping techniques, or other image processing techniques, to adapt SDR and/or HDR imagery content provided by the digital content providers for the consumer's media viewing devices and displays. Unfortunately, HDR-to-SDR tone mapping techniques often times merely compress the entire tonal range downward, causing all content to appear significantly darker than intended. In the opposite case, SDR-to-HDR tone mapping techniques could stretch highlights above reference white to imitate native HDR content. Specifically, tone mapping techniques may be used to adjust the luminance range of the SDR and/or HDR imagery content, such that the SDR and/or HDR imagery content is suitable for the specific luminance and color range of the consumer's media viewing device. However, conventional tone mapping techniques (e.g., HDR10, Dolby Vision, HDR10+) may compress the entire luminance range in order to protect highlight detail, producing results which may be inconsistent with the desired consumer experience, such as overall darker imagery. Further, in certain situations, tone mapping techniques may not exist within the consumer's media viewing device, thereby resulting in distorted imagery (e.g., undesirable color shifts (from BT.2020 to BT.709 primaries), distorted colors, distorted brightness) on the consumer's media viewing devices.

Moreover, in certain situations, the digital content providers may desire to have sufficient creative control over the display of SDR or HDR imagery content that is transmitted to the consumers' various media viewing devices. The digital content providers may desire to have sufficient control over the image processing techniques that result from international distribution of HDR imagery content, as parameters of the SDR and/or HDR imagery content (e.g., SDR peak-white, HDR Graphics/Reference/Diffuse white, midtones gamma adjustment) may vary for distribution facilities in different countries. Accordingly, it may be beneficial to provide for dynamic normalization of HDR and SDR imagery content for display on media viewing devices with varying display capabilities. Further, it may be beneficial to provide for systems and methods that allow for controllable tone mapping of imagery content that produces more consistent and desired displayed image media when transmitted to various types of media viewing devices with different image processing capabilities.

Described herein are systems and techniques for implementing more consistent tone mapping across consumer media devices. Specifically, a variety of anchor points may be specified by certain entities (e.g., a content provider and/or consumer media device manufacturer), enabling more predictable/consistent tone mapping/luminance range compression across consumer media devices.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

Embodiments described herein provide enhanced flexible luminance adjustment based upon specified anchor point values (e.g., particular defined perceptual parameter points) associated with the content. For example, variable luminance and gamut compression may be provided at a certain knee point described by one or more anchor points associated with content. In this manner, a larger range of luminance may be utilized by the midtones range of the content, while higher compression/less dynamic range may be used by the highlight regions of the content. Further, in some instances, a gamma curve may be defined based upon one or more anchor points, which may be used to adjust the average brightness of HDR images between black and reference white. For SDR this same gamma adjustment could be used to add a gamma adjustment for the entire signal range. These adjustments together, could be used in a complementary ambient light compensation. In some embodiments, the dynamic/variable compression may be defined by a content provider and/or by a vendor associated with an output electronic device that displays the content.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
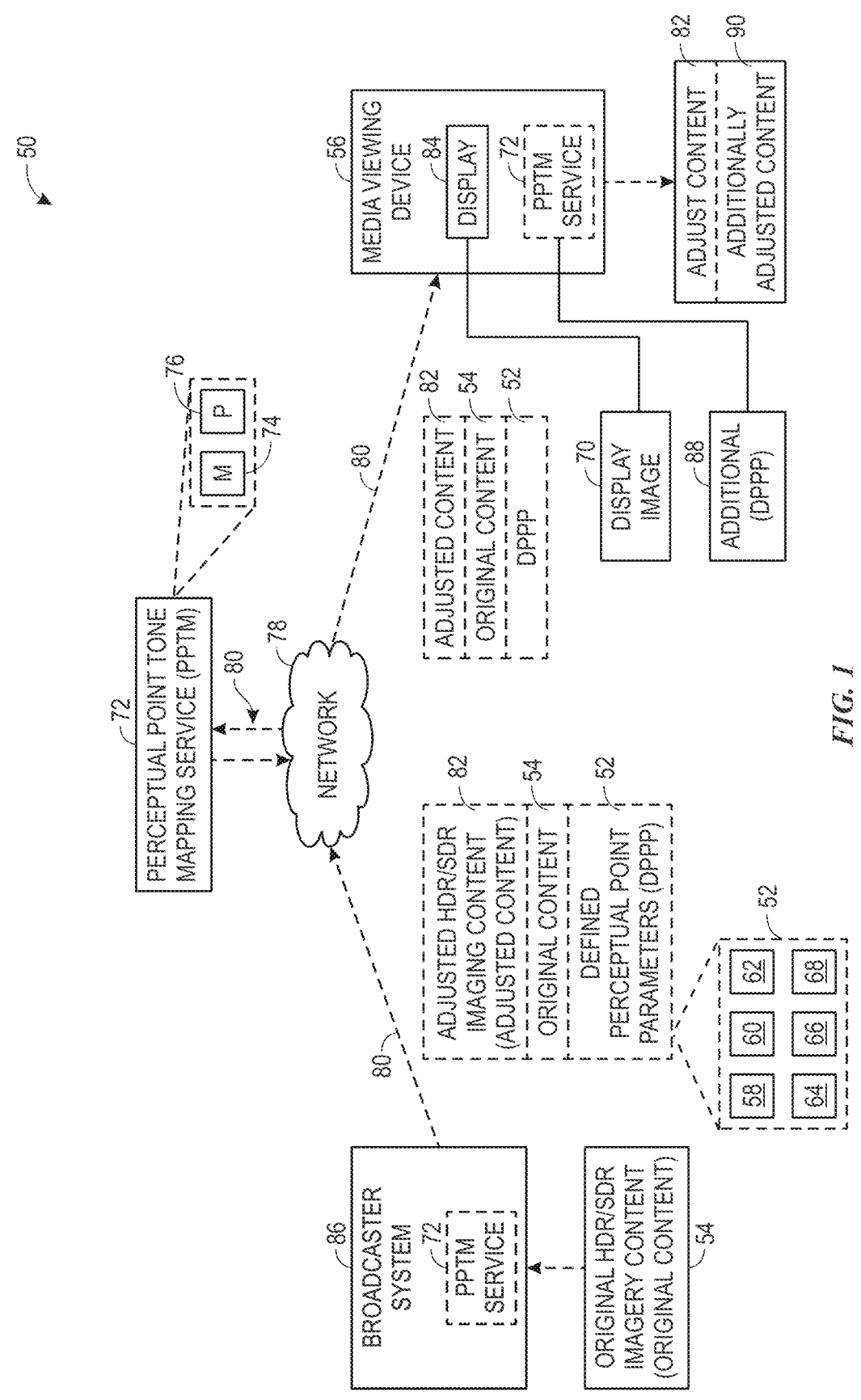
FIG. 1 is a schematic diagram illustrating a perceptual point tone mapping system, in accordance with one or more current embodiments.

With the foregoing in mind, FIG. 1 illustrates a perceptual point tone mapping system 50 that yields consistent and controllable normalization of HDR and/or SDR imagery content 54 to be displayed on various media viewing devices 56. Specifically, the perceptual point tone mapping system 50 may include defined perceptual point parameters 52 for image luminance points (e.g., anchor points, brightness points) and/or luminance regions (e.g., brightness ranges) of an image (e.g., image signal, image data, image raster) of the SDR and/or HDR imagery content 54. The defined perceptual point parameters 52 of the SDR and/or HDR imagery content 54 may be a gamma adjustment point 58, a gamma-adjustment region 60 (e.g., range of luminance values from black to reference white), a graphic white anchor 62 (e.g., reference-white anchor 62 value at 203 nits or 260 nits for HDR content), one or more variable compression points 66 within a highlight region 68, and/or a peak white anchor 64 (e.g., indicates maximum luminance value for imagery content and/or end display capabilities). The defined perceptual point parameters 52 may vary between the SDR and/or HDR imagery content 54 due to differing luminance ranges. Specifically, the defined perceptual point parameters 52 of the SDR imagery content may specify a gamma adjustment point 58 for the gamma-adjustment region 60, a reference-white anchor 62 (e.g., selected based upon a video format), one or more variable compression points 66 within a highlight region 68, and a peak white anchor 64 (e.g., at 100% signal range and/or "extended" to 109% of the signal range being mapped to a display), as some SDR compatible media viewing devices may be limited to nominal signal ranges from 0 to 100%. It should be understood that in some instances, the SDR and/or HDR imagery content 54 may include an overshoot and/or an undershoot of the signal range. For example, the perceptual point tone mapping system 50 may account for SDR and/or HDR imagery content 54 with a signal range of −7% to 109% so as to capture and/or preserve content that may fall outside of the 0 to 100% signal range. Certain compatible media viewing devices may have display capabilities that include this extended range, and thus capturing the SDR and/or HDR imagery content 54 that falls outside of the 0 to 100% signal range may provide for a resulting displayed image with increased detail and increased range of contrast (e.g., increased color volume or range of both color and light).

Furthermore, the defined perceptual point parameters 52 may be used to process the SDR and/or HDR imagery content 54 to be compatible with the media viewing devices 56 of varying brightness (e.g., illumination) capabilities and/or varying imagery content compatibilities (e.g., SDR compatible, HDR compatible) while preserving the intended look, appearance, or creative intent of the displayed image 70 (e.g., by retaining a significant luminance range for mid-tones and a stable reference white). Additionally, the defined perceptual point parameters 52 may be indicated by the digital content provider, the consumer (e.g., a user), the media viewing device manufacturer, and/or any combination thereof to produce a desired displayed image 70 (e.g., video imagery) presented by the consumer media viewing device. Moreover, the defined perceptual point parameters 52 may be adjustable (e.g., variable) points (e.g., values), such as the gamma adjustment point 58 for the gamma-adjustment region 60, which when adjusted, may affect processing of the content, resulting in beneficial changes to the brightness of the displayed image 70. Further, in some aspects, the one or more variable compression points 66 within the highlight region 68 may be adjustable, which when adjusted, may variably compress the highlight region 68 of the SDR and/or HDR imagery content 54 to be compatible with the brightness range of the media viewing devices 56. Additionally, the graphic white anchor 62 (e.g., reference-white anchor 62) and the "extended" peak white anchor 64 may also be adjustable points for compatibility with the media viewing device 56 and/or for compatibility with various international distribution facilities. Alternatively, the graphic white anchor 62 and the gamma adjustment point 58 for the gamma-adjustment region 60 may be static, defined perceptual point parameters 52 regulated by the content provider, which may enable consistency in defining particular luminance or compression regions across media viewing devices 56 with varying display capabilities.

In some aspects, the perceptual point tone mapping system 50 may also include a perceptual point tone mapping service 72. The perceptual point tone mapping service 72 may include a memory 74 and processing circuitry 76. The memory 74 may include volatile memory, such as random access memory (RAM), and/or non-volatile memory, such as read-only memory (ROM), optical drives, hard disc drives, solid-state drives, or any other non-transitory computer-readable medium that includes instructions. The processing circuitry 76 may be configured to execute such instructions. For example, the processing circuitry 76 may include one or more application specific integrated circuits (ASICs), one or more field programmable gate arrays (FP-GAs), one or more general purpose processors, or any combination thereof. Further, the perceptual point tone mapping service 72 may be communicatively coupled to a network 78 through one or more communication channels 80. The communication channels 80 may include various Internet technologies, wired or wireless networks, or various cable or satellite technologies.

In some aspects, the perceptual point tone mapping service 72 may be an independent service communicatively coupled to the network 78 that receives the HDR and/or SDR imagery content 54 and performs adjustments utilizing one or more of the defined perceptual point parameters 52 discussed herein. For example, the perceptual point tone mapping service 72 may receive the defined perceptual point parameters 52 from a content provider, the media viewing device 56, a user, or any combination thereof. The perceptual point tone mapping service 72 may then perform the adjustments to the HDR and/or SDR imagery content 54 using the received defined perceptual point parameters 52 to produce adjusted HDR and/or SDR imagery content 82. The adjusted HDR and/or SDR imagery content 82 may then be transmitted to the media viewing device 56 to be displayed by a display 84 of the media viewing device 56. Additionally, or alternatively, the adjusted HDR and/or SDR imagery content 82 may be transmitted internationally to media distribution facilities prior to being transmitted to the consumer media viewing device 56 to be displayed.

Furthermore, in some aspects, the perceptual point tone mapping service 72 may be located at a broadcaster system 86 (e.g., a media content provider system) that may receive the HDR and/or SDR imagery content 54. The broadcaster system 86 may be communicatively coupled to the network 78 through one or more communication channels 80. The communication channels 80 may include various Internet technologies, wired or wireless networks, or various terrestrial or satellite technologies. In some embodiments, the broadcaster system 86 may transmit the HDR and/or SDR imagery content 54 (e.g., signal, data) to the network 78 for distribution to the various media viewing devices 56. Additionally, in some aspects, the broadcaster system 86 may include at least a portion of the perceptual point tone mapping service 72 discussed herein, which may receive the HDR and/or SDR imagery content 54 and perform adjustments utilizing one or more of the defined perceptual point parameters 52, producing the adjusted HDR and/or SDR imagery content 82 to the network 78. In particular, the broadcaster system 86 may include various inputs to select the desired defined perceptual point parameters 52 and/or may receive the defined perceptual point parameters 52 from the media viewing device manufacturer, the international distribution facilities, a user, or any combination thereof. The broadcaster system 86 may then adjust (e.g., change, modify, process) the HDR and/or SDR imagery content 54 via the perceptual point tone mapping service 72 using the defined perceptual point parameters 52 to produce the adjusted HDR and/or SDR imagery content 82, which then may be transmitted by the broadcaster system 86 to the network 78 by the one or more communication channels 80. In this way, the perceptual point tone mapping service 72 within the broadcaster system 86 may enable the content provider dynamic control over the adjusted HDR and/or SDR imagery content 82, and thus sufficient control over the resulting displayed image 70 (e.g., picture, video) presented on the displays 84 of the various consumer media viewing devices 56.

In some aspects, the perceptual point tone mapping system 50 may include the media viewing device 56 that may be communicatively coupled to the network 78 through the one or more communication channels 80. The communication channels 80 may include various Internet technologies, wired or wireless networks, or various terrestrial or satellite technologies. The media viewing device 56 may include outputs/inputs such as the display 84 for displaying digital image content. For example, the various media viewing devices 56 may be televisions, projectors, computers, gaming systems, and handheld devices such as mobile devices and video players. The media viewing device 56 may receive the HDR and/or SDR imagery content 54 to be displayed on the display 84 of the media viewing device 56. Depending on the media viewing device manufacturer and/or product lines of the manufacturer, the media viewing device 56 may have specific display capabilities. For example, the media viewing devices 56 with HDR compatible displays may have certain brightness capabilities including a range of luminosity from 0 nits to 1,000 nits.

In an aspect, the media viewing device 56 may include circuitry that implements the perceptual point tone mapping service 72 as discussed herein. In this way, the perceptual point tone mapping service 72 of the media viewing device 56 may receive the HDR and/or SDR imagery content 54 from the broadcaster system 86 via the network 78 and perform adjustments to the HDR and/or SDR imagery content 54 using the defined perceptual point parameters 52. The one or more defined perceptual point parameters 52 may be received from the broadcaster system 86 via the network 78 along with the HDR and/or SDR imagery content 54; may be received from a user through the one or more inputs of the media viewing device 56; may be indicated by the media viewing device manufacturer; may be determined by the display capabilities of the particular media viewing device 56; or may be received or determined by any combination thereof. For example, the broadcaster system 86 may transmit via the network 78 the HDR and/or SDR imagery content 54 in combination with the one or more defined perceptual point parameters 52, such as the gamma adjustment point 58 for the gamma-adjustment region 60, the graphic white anchor 62, and the peak white anchor 64. The perceptual point tone mapping service 72 of the media viewing device 56 may then receive the HDR and/or SDR imagery content 54 and one or more defined perceptual point parameters 52 and may also indicate additional defined perceptual point parameters 88, such as the one or more variable compression points 66 within the highlight region 68, based on the media viewing device's 56 display capabilities. Further, the perceptual point tone mapping service 72 may perform adjustments to the HDR and/or SDR imagery content 54 using the defined perceptual point parameters 52 and the additional defined perceptual point parameters 88 to produce the adjusted HDR and/or SDR imagery content 82, which is then outputted to the display 84 of the media viewing device 56.

In some aspects, the perceptual point tone mapping service 72 of the media viewing device 56 may receive adjusted HDR and/or SDR imagery content 82 from the broadcaster system 86 and/or the independent perceptual point tone mapping service 72 via the network 78 and may then further modify the adjusted HDR and/or SDR imagery content 82 using the additional defined perceptual point parameters 88 indicated within the media viewing device 56 to produce the additionally adjusted HDR and/or SDR imagery content 90. The additionally adjusted HDR and/or SDR imagery content 90 may then be outputted by the display 84 of the media viewing device 56. For example, the broadcaster system 86 may transmit via the network 78 the adjusted HDR imagery content 82 to the media viewing device 56. The perceptual point tone mapping service 72 of the media viewing device 56 may then receive the adjusted HDR imagery content 82 and may also indicate the additional defined perceptual point parameters 88 based on the media viewing device's 56 display capabilities, such as the one or more variable compression points 66 within the highlight region 68. Further, the perceptual point tone mapping service 72 associated with the media viewing device 56 may perform additional adjustments to the adjusted HDR imagery content 82 using the additional defined perceptual point parameters 88 to produce the additionally adjusted HDR imagery content 90, which is compatible with the particular media device 56 and outputted to the display 84 of the media viewing device 56.

Figure 2:
FIG. 2 is a graphical representation of color illumination of an exemplar frame of HDR imagery content, in accordance with one or more current embodiments.
Figure 2:
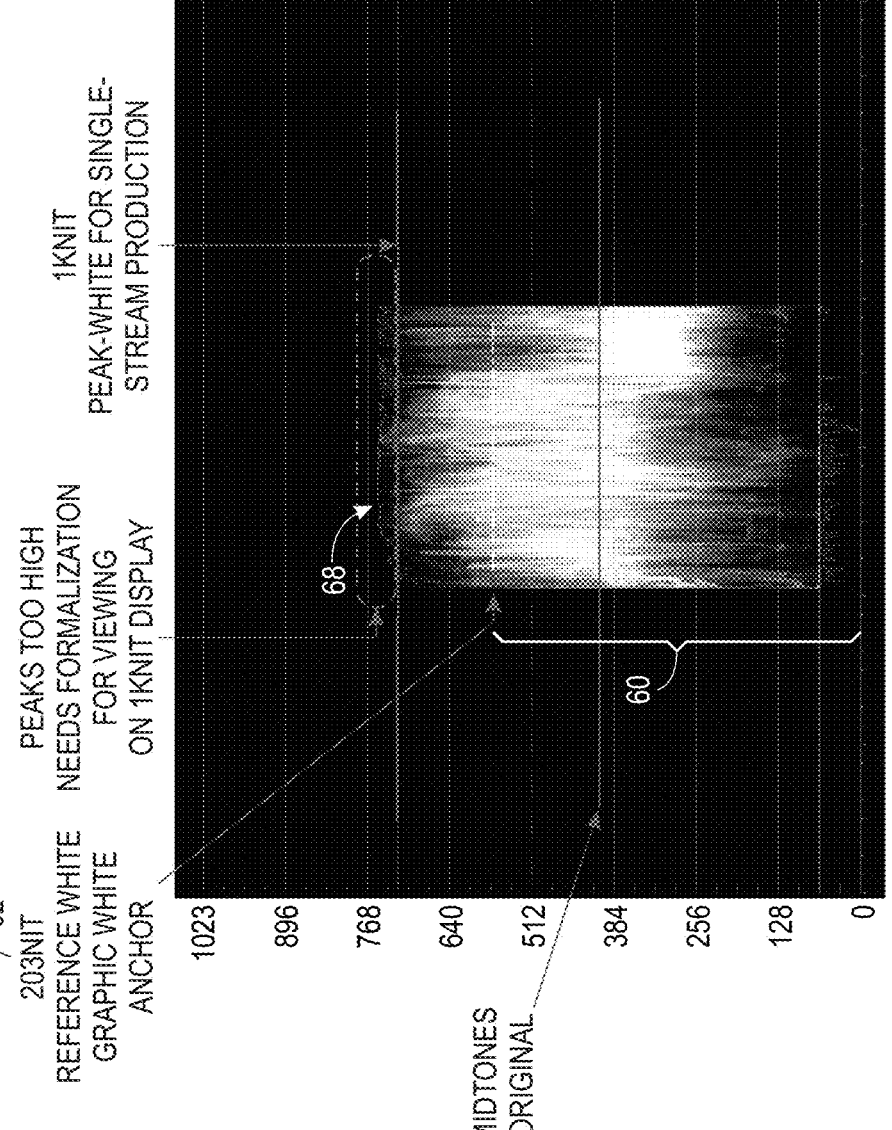
Figure 3:
FIG. 3 is a graphical representation of color illumination of the exemplar frame of FIG. 2, processed by conventional tone mapping techniques, in accordance with one or more current embodiments.
Figure 3:
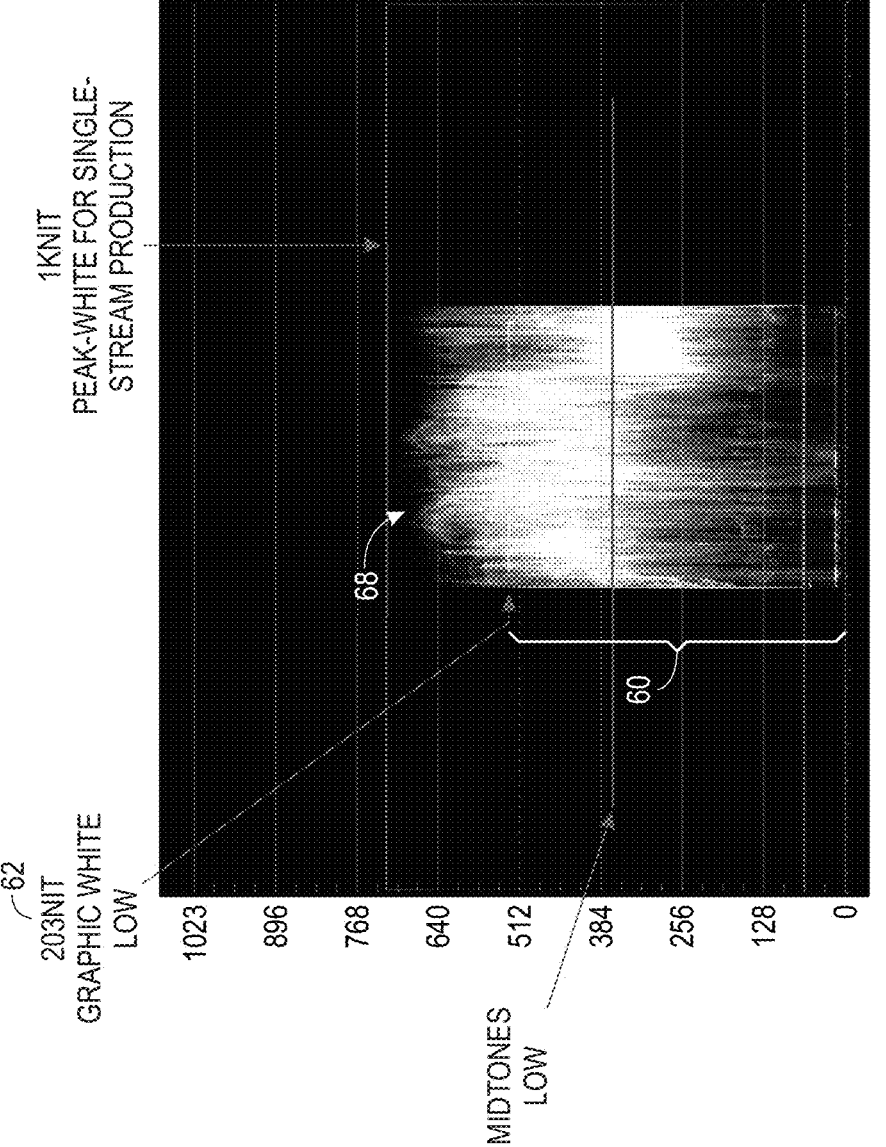
Figure 4:
FIG. 4 is a graphical representation of color illumination of the exemplar frame of FIG. 2 processed by the perceptual point tone mapping system of FIG. 1, in accordance with one or more current embodiments.
Figure 4:
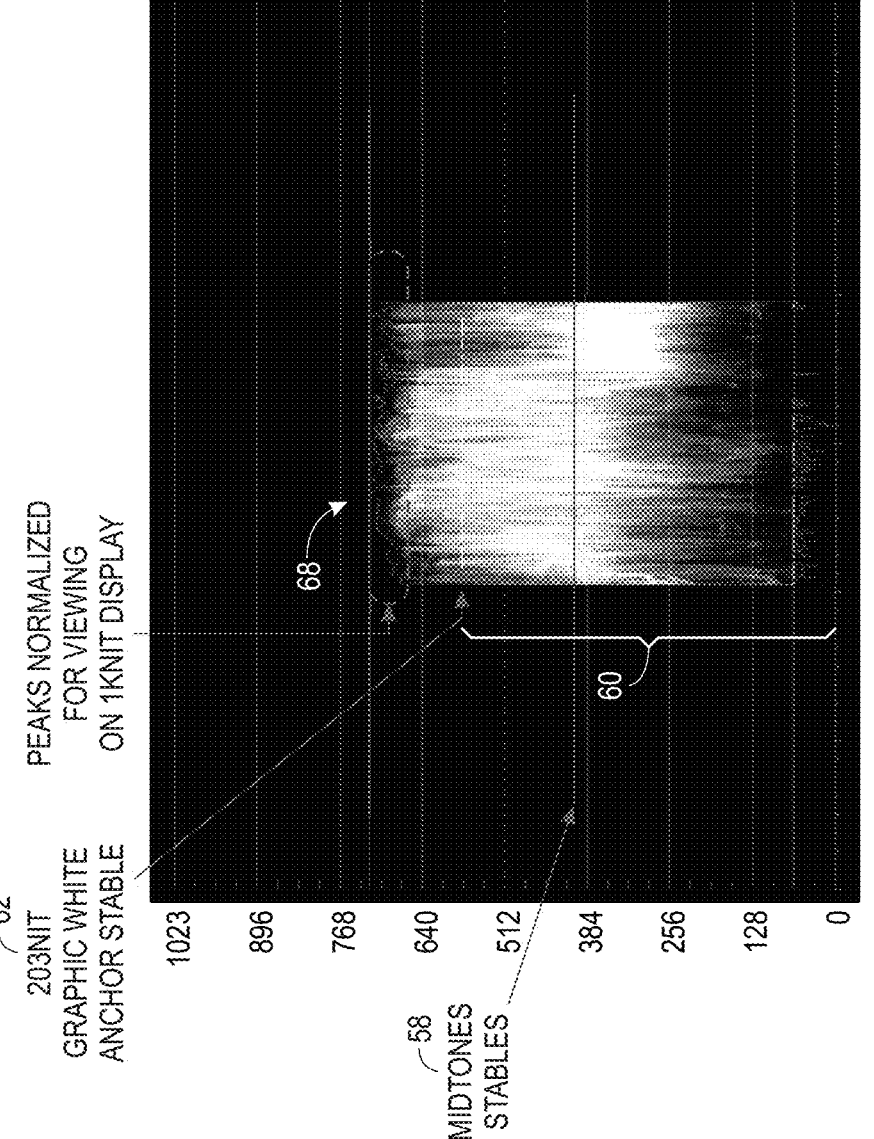

To further illustrate the resulting displayed adjusted HDR and/or SDR imagery content 82 and/or the additionally adjusted HDR and/or SDR imagery content produced by the perceptual point tone mapping system 50, FIGS. 2-4 contrast the displayed image 100 produced by conventional tone mapping techniques with the resulting displayed image 102 produced by the tone mapping techniques of the perceptual point tone mapping system 50 discussed therein. In the illustrated embodiment, FIG. 2 is a graphical representation of color illumination of an exemplar frame (e.g., displayed image 104) of HDR imagery content 54 at 2,500 nits that may be, for example, transmitted by the broadcaster system 86 to the media viewing device 56. As an example, the media viewing device 56 receiving the HDR imagery content 54 of FIG. 2 may have display capabilities of 1,000 nits. As seen in FIG. 2, the graphical representation of the HDR imagery content 54 has portions (e.g., peaks) of the highlight region 68 that exceed the media viewing device's 56 luminance (e.g., brightness) capabilities. Therefore, the HDR imagery content 54 may need to be adjusted (e.g., the peaks may be clipped by the media viewing device 56) in order to be displayed by the display 84 of the media viewing device 56. In addition, the defined perceptual point parameters 52, such as the graphic white anchor 62 and the gamma adjustment point 58 for the gamma-adjustment region 60 are illustrated in FIGS. 2-4 to compare the tone mapping techniques of conventional tone mapping to the perceptual point tone mapping system 50 discussed therein.

FIG. 3 illustrates a graphical representation of color illumination of the exemplar frame (e.g., displayed image 100) of the received HDR imagery content 54 of FIG. 2 when processed by conventional tone mapping techniques. When comparing FIG. 2 to FIG. 3, the overall brightness of the displayed image 100 is noticeably darker (e.g., decreased) in FIG. 3 than the brightness of the displayed image 104 in FIG. 2. In particular, when comparing the graphical representations of FIG. 3 to FIG. 2, the color luminance range of the displayed image 100 has been compressed over all of the luminance points (e.g., across every pixel of the image). In particular, the peaks of the highlight region 68 in FIG. 3 have been compressed to below the 1,000 nits brightness capacity of the media viewing device 56. However, the graphic white anchor 62 value in FIG. 3 is significantly below the graphic white anchor 62 value in FIG. 2 of 203 nits. Similarly, the gamma-adjustment region 60 (e.g., region below graphic white point) of FIG. 3 is significantly compressed when compared to the gamma-adjustment region 60 of FIG. 2.

In contrast, FIG. 4 illustrates a graphical representation of color illumination of the exemplar frame (e.g., displayed image 102) of the received HDR imagery content 54 of FIG. 2 when processed by the perceptual point tone mapping system 50. Using the perceptual point tone mapping system 50, certain portions of the input frames are less compressed than other regions, based upon perception points/anchor points associated with these input frames. For example, the gamma-adjustment region 60 may be less compressed than a highlight region 68 of the frame, as a majority of the pixels lie within this gamma-adjustment region 60, while only a small portion of the pixels lie in the highlight region 68. As will be described herein, the current techniques may provide a "knee" or transition in compression levels at a particular perception point/anchor point. For example, the variable compression may initiate at a knee defined by the graphic white anchor 62 (e.g. the reference-white anchor 62) and conclude at the peak white anchor 64. Further, the gamma adjustment point 58 in the gamma-adjustment region 60 may be used to define a gamma curve that define changes in average luminance in the gamma-adjustment region 60. In this manner, certain perception points may be "anchored" or fixed in the adjusted output, causing better adjusted results, while still mitigating highlight clipping.

For example, when comparing FIG. 2 to FIG. 4, the overall brightness of the displayed image 102 in FIG. 4 is substantially the same as the brightness of the displayed image 104 in FIG. 2. In particular, when comparing the graphical representations of FIG. 4 to FIG. 2, the color illumination range of the displayed image 102 appears substantially unchanged (e.g., unaltered). Specifically, the graphic white anchor 62 in FIG. 4 is stable and remains at the same point (e.g., 203 nits) as the graphic white anchor 62 in FIG. 2 of 203 nits. Similarly, the gamma-adjustment region 60 (e.g., region below graphic white anchor 62) of FIG. 4 is noticeably stable when compared to the gamma-adjustment region 60 of FIG. 2. Further, to be compatible with the display capabilities of the example media viewing device 56, the peaks of the highlight region 68 in FIG. 4 have been compressed to the 1,000 nits brightness capacity of the media viewing device 56. However, the look of the displayed image 102 is substantially unchanged when compared to the displayed image 104.

Figure 5:
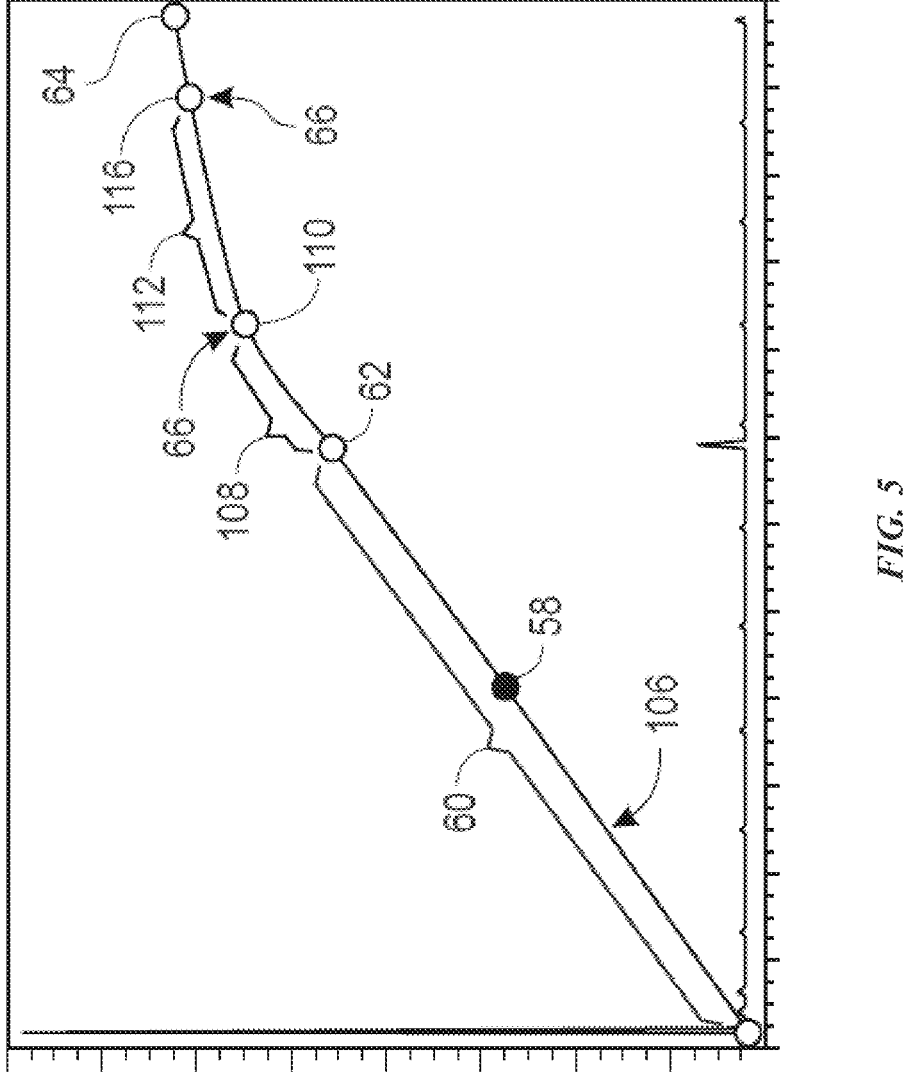
FIG. 5 illustrates graphical representations of a non-linear functions of compression rates of image luminance adjustable by the perceptual point tone mapping system of FIG. 1, in accordance with the one or more current embodiments.

FIG. 5 illustrates graphical representations of a non-linear function of compression rates of image luminance adjustable by the perceptual point tone mapping system 50. The perceptual point tone mapping system 50 (e.g., the perceptual point tone mapping service 72) may implement a compression curve 106 to provide for controllable and consistent adjustment of the HDR and/or SDR imagery content 54 for delivery and ultimately displaying on various media viewing devices 56. The compression curve 106 illustrates and may determine variable rates of compression to be applied to the HDR and/or SDR imagery content 54 and/or the adjusted HDR and/or SDR imagery content 82 to produce the adjusted HDR and/or SDR imagery content 82 and/or the additionally adjusted HDR and/or SDR imagery content 90, respectively. In some embodiments, the adjustment may be predefined and applied using one or more equations. Alternatively, the adjustment may be applied using one or more predetermined lookup tables. The one or more predetermined look-up tables may receive input luminance values (e.g., luminance points) corresponding to the HDR and/or SDR imagery content 54 and/or the adjusted HDR and/or SDR imagery content 82 and provide an indication of output luminance values corresponding to the adjusted and/or additionally adjusted HDR and/or SDR imagery content 82, 90.

Further, the compression curve 106 may include the defined perceptual point parameters 52. In an aspect, the defined perceptual point parameters 52 may be the gamma adjustment point 58 in the gamma-adjustment region 60 (e.g., below the graphic white anchor 62), the graphic white anchor 62 (e.g., set at 203 nits, 260 nits internationally), the one or more variable compression points 66 within the highlight region 68 (e.g., above the graphic white anchor 62), and the peak white anchor 64. In an aspect, the gamma adjustment point 58 within the gamma-adjustment region 60 may be adjusted (e.g., increased or decreased) to adjust the luminance adjustment rate of the compression curve 106 in the gamma-adjustment region 60. In particular, the gamma adjustment point 58 may be adjusted and, in turn, affect a gamma curve applied to the gamma-adjustment region 60 of the HDR and/or SDR imagery content 54. This may result in changes in the overall tonal brightness of the HDR and/or SDR imagery content 54. In this way, the perceptual point tone mapping service 72, utilized independently, by the broadcaster system 86, by the media viewing device 56, or any combination thereof, may be used to controllably adjust the tonal brightness of the resulting displayed image 70. For example, the broadcaster system 86 may desire creative control over the look of a particular image or scene (e.g., imagery video) of the HDR and/or SDR imagery content 54 and thus the displayed image 70 presented to their viewers. The gamma adjustment point 58 may be decreased to yield an overall darker displayed image 70 for particular scenes. Additionally, or alternatively, the gamma adjustment point 58 may be increased to yield an overall brighter (e.g., lighter) displayed image 70 for the particular scenes.

In certain aspects, the compression curve 106 also includes the graphic white anchor 62 (e.g., the reference-white anchor 62). As discussed herein, the graphic white anchor 62 may be a static point defined, for example, by the broadcaster system 86 and/or the content creator. Alternatively, the graphic white anchor 62 may be controllably defined and/or adjusted by the user, the manufacturer of the media viewing device 56, and/or the broadcaster system 86. The graphic white anchor 62 may define the top of the gamma-adjustment region 60 and may correspond to the brightness of a white color typically used to display graphics (e.g., text) in a particular scene. For example, the graphic white anchor 62 may be set at 203 nits (or 260 nits internationally) as a standard by the perceptual point tone mapping system 50 despite varying HDR and/or SDR imagery content 54 and/or varying display capabilities of various media viewing devices 56.

Further, the compression curve 106 may also include the one or more variable compression points 66 within the highlight region 68. As discussed herein, in some aspects, the one or more variable compression points 66 may be a static points or adjustable points defined, for example, by the broadcaster system 86 and/or content creator. Additionally, or alternatively, the one or more variable compression points 66 may be controllably defined or adjusted by the user and/or the manufacturer of the media viewing device 56. In particular, the one or more variable compression points 66 may define one or more transition points within the highlight region 68 which may indicate variable compression rates to be applied to luminance values within the highlight region 68 to normalize the HDR and/or SDR imagery content 54 for compatibility with a particular media viewing device 56 with a defined brightness capacity. Specifically, the one or more variable compression points 66 may be set at a particular standard value by the perceptual point tone mapping system 50 located at a particular media viewing device 56 in order to adjust the HDR and/or SDR imagery content 54 or further adjust the adjusted HDR and/or SDR imagery content 82 to be compatible for display on the particular media viewing device 56.

Additionally, the compression curve 106 may also include the peak white anchor 64. As discussed herein, in some embodiments, the peak white anchor 64 may be a static point or an adjustable point defined, for example, by the broadcaster system 86. Additionally, or alternatively, the peak white anchor 64 may be defined or adjusted by the user and/or the manufacturer of the media viewing device 56. The peak white anchor 64 may indicate the end of the variable compression in the highlight region 68 which may correspond to a brightest tone of color (e.g., white value) in a particular scene or image of the HDR and/or SDR imagery content 54. For example, the peak white anchor 64 may be set at a particular value based on varying display capabilities of various media viewing devices 56.

In certain aspects, a value of the graphic white anchor 62 (e.g., the reference-white anchor 62) may be dynamic and adjust (e.g., increase, decrease) based on a detected brightness level of ambient light. For example, one or more sensors communicatively coupled to a media viewing device

56 may detect (e.g., measure) a brightness level representing an amount of light (e.g., ambient light) present in a space in which the media viewing device 56 may be viewed. In some aspects, the brightness level of the ambient light may include surround luminance, such as the amount of light in or brightness of an area (e.g., a background area) surrounding a display of the media viewing device 56. Additionally or alternatively, the brightness level of the ambient light may include a room luminance, such as the amount of light in or brightness of a space in which the displayed image 70 of the media viewing device 56 is being viewed. As the detected brightness level of the ambient light increases, the value of the graphic white anchor 62 may be increased so as to increase visibility of the displayed image 70 when the displayed image 70 is being viewed in relatively brighter surrounding environments. On the other hand, as the detected brightness level of the ambient light decreases, the value of the graphic white anchor 62 may be decreases so as to increase visibility of the displayed image 70 when being viewed in a relatively darker surrounding environment.

Furthermore, as discussed herein, a particular media viewing device may have set display capabilities including a defined luminance peak value (e.g., max luminance value). In this way, in response to adjusting (e.g., increasing, decreasing) the value of the graphic white anchor 62, one or more additional defined perceptual points parameters 52, such as the gamma adjustment point 58 in the gamma-adjustment region 60 and/or the one or more variable compression points 66 within the highlight region 68 may also be adjusted (e.g., increased, decreased) to preserve a ratio (e.g., proportion, relationship) between the value of the graphic white anchor 62 and one or more values of the additional defined perceptual point parameters 52 (e.g., and thus preserve the intended look of the resulting displayed image 70) and/or to account for changes in luminance ranges above and/or below the graphic white anchor 62. For example, in response to a detected increase in the brightness level of the surrounding environment, the graphic white anchor 62 may be increased, and in response, the one or more variable compression points 66 within the highlight region 60 may be further compressed to account for a resulting decrease in a luminance range between the increased graphic white anchor 62 and the peak white anchor 64. Additionally, in some instances, the gamma adjustment point 58 may be adjusted to account for a resulting increase in a luminance range of the gamma-adjustment region 60. Variably adjusting one or more of the defined perceptual point parameters 52 in response to a detected brightness level of a surrounding environment may enable the resulting displayed image 70 to more closely follow natural eye adaptation and provide for ease of viewing of the displayed image 70 of the media viewing device 56 despite changes in the brightness level of ambient light of the environment surrounding the media viewing device 56.

As an example, referring to FIG. 2, the HDR imagery content 54 may be at 2,500 nits, whereas the max brightness of the particular media viewing device 56 receiving the HDR imagery content 54 may be 1,000 nits. The perceptual point tone mapping system 50 located at the particular media viewing device 56 may utilize the one or more variable compression points 66 of the compression curve 106 that are above the graphic white anchor 62 (e.g., set at 203 nits) to variably compress luminance points of the HDR imagery content 54 that are above the graphic white anchor 62 value at greater rates of compression than compression rates applied to the luminance points of the HDR imagery content 54 that are below the graphic white anchor. As a result, the values of the luminance points of the HDR and/or SDR imagery content 54 above the graphic white anchor 62 (e.g., above 203 nits) would variably decrease up to the peak white anchor 64 (e.g., max luminance, max brightness value) of the particular media viewing device 56, while the remaining luminance points of the HDR imagery content below the graphic white anchor 62 are substantially unchanged (e.g., not compressed or less compressed). Further, each of the one or more variable compression points 66 may define separate compression regions that each correspond to a different rate of compression. For example, a first compression region 108 between the graphic white anchor 62 and a first compression point 110 of the one or more variable compression points 66 may compress at a lower rate than a second compression region 112 between the first compression point 110 and a second compression point 116 of the one or more variable compression points 66. In this way, a relatively small portion of the total luminance values of the HDR and/or SDR imagery content 54 receive compression and/or adjustment as opposed to the entire range of the luminance values. As a result, the change in the overall tonal brightness of the adjusted and/or the additionally adjusted HDR and/or SDR imagery content 82, 90 produced by the perceptual point tone mapping system 50 may be minimal (e.g., undetectable to the viewer of the displayed image 70) when compared to the received HDR and/or SDR imagery content 54 prior to the adjustment. Moreover, the resulting displayed image 70 from the adjusted and/or the additionally adjusted HDR and/or SDR imagery content 82, 90 may maintain the intended look (e.g., creative intention) of the received HDR and/or SDR imagery content 54, as seen when comparing the resulting displayed image 102 in FIG. 4 to the resulting displayed image 104 in FIG. 2.

In certain aspects, the perceptual point tone mapping system 50 (e.g., the perceptual point tone mapping service 72) may implement the compression curve 106 containing the one or more defined perceptual point parameters 52 to provide for controllable adjustment of various imagery content (e.g., HDR, SDR, HLG, PQ-HDR) of multiple images to produce a composite image for delivery (e.g., transmission) and/or ultimately displaying on various media viewing devices 56. In particular, use of the tone mapping techniques of the perceptual point tone mapping system 50, as discussed therein, when combining (e.g., merging, layering) one or more separate images may result in a single consistent composite image that contains the various imagery content from the one or more separate images and includes a desired displayed appearance, a desired imagery content type (e.g., HDR and/or SDR imagery content), a desired luminance range, or any combination thereof. In some aspects, the one or more separate images may be adjusted by the perceptual point tone mapping system 50 prior to combining the one or more separate images. In other aspects, the tone mapping techniques of the perceptual point tone mapping system 50 may be implemented concurrently with the combination of the one or more separate images to produce the single composite image.

As an example, a first image received by the perceptual point tone mapping service 72 may include SDR imagery content, such as graphics, while a second image received may contain HDR imagery content. The content provider (e.g., broadcaster system 86, the perceptual point tone mapping service 72) and/or media viewing devices 56 may desire to combine the first and the second image to create a single composite image that comprises both the SDR imagery content from the first image and the HDR imagery content from the second image. As a result, the SDR imagery content from the first image and the HDR imagery content from the second image may be adjusted by the perceptual point tone mapping system 50 (e.g., the perceptual point tone mapping service 72) using the one or more defined perceptual point parameters 52 to produce a consistent composite image with a common imagery content format and/or common luminance levels. In some aspects, the first image may be adjusted by the perceptual point tone mapping system 50 (e.g., the perceptual point tone mapping service 72) to correspond to (e.g., equal, match, fit) the luminance levels and/or the image content format of the second image. In other aspects, the perceptual point tone mapping system may include desired (e.g., pre-determined) luminance levels (e.g., the one or more defined perceptual point parameters 52) and a desired imagery content type, such as HDR imagery content, for the resulting composite image. In this case, the SDR imagery content from the first image and the HDR imagery content from the second image may be adjusted (e.g., normalized) using the pre-determined one or more defined perceptual point parameters 52 of the perceptual point tone mapping system 50 to produce the separate, single composite image.

Figure 6:
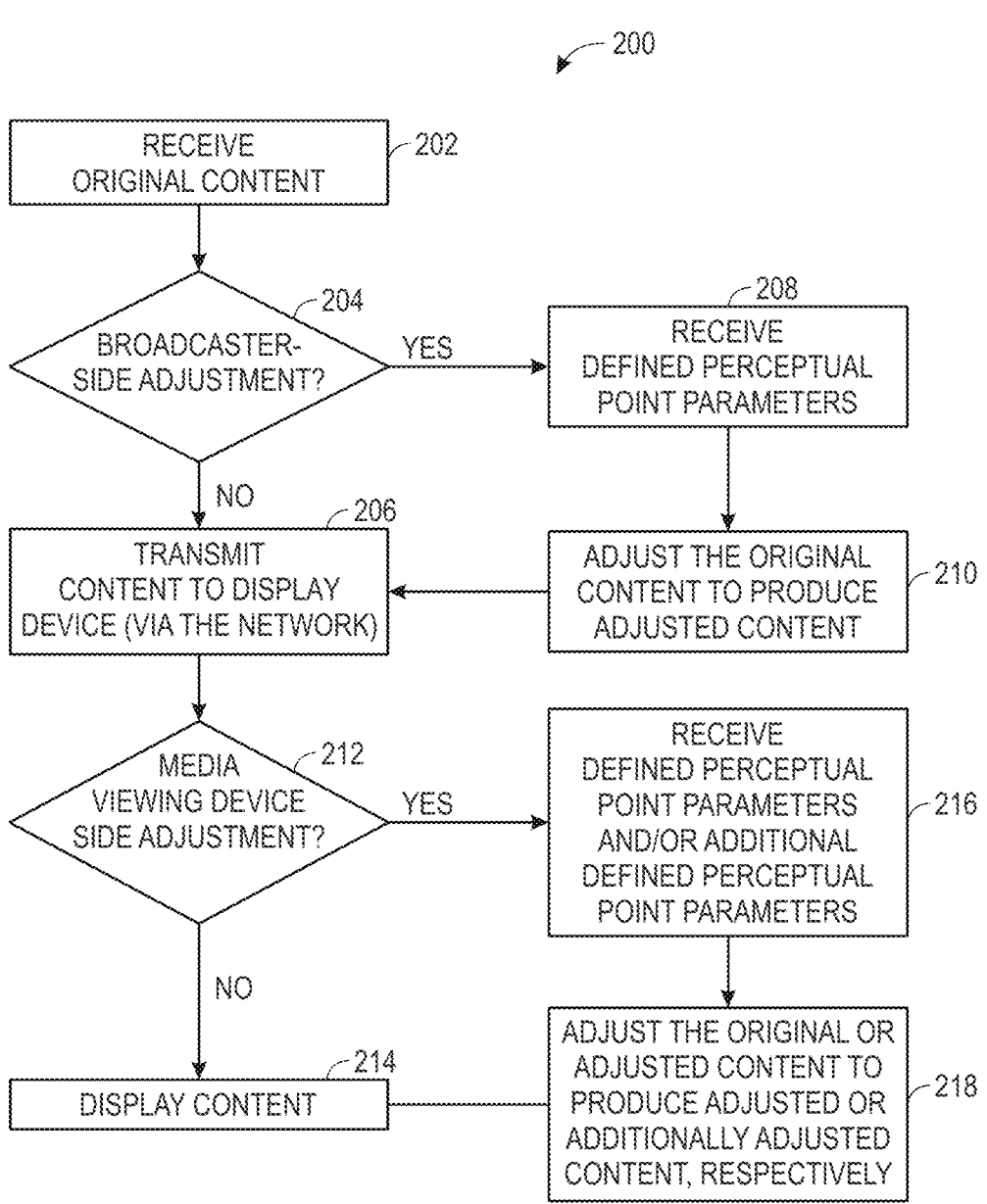
FIG. 6 is a flow diagram, illustrating a process for adjusting HDR or SDR imagery content using the perceptual point tone mapping system of FIG. 1, in accordance with one or more current embodiments.

FIG. 6 is a flow diagram, illustrating a process or method 200 for adjusting HDR and/or SDR imagery content using the perceptual point tone mapping system 50. Any suitable device (e.g., the processing circuitry 76 of the perceptual point tone mapping service 72) may perform the method 200. In one embodiment, the method 200 may be implemented by executing instructions stored in a tangible, non-transitory, computer-readable medium (e.g., the memory 74 of the perceptual point tone mapping service 72). For example, the method 200 may be performed at least in part by one or more software components, one or more hardware components, one or more software applications, and the like. While the method 200 is described using steps in a specific sequence, additional steps may be performed, the described steps may be performed in different sequences than the sequence illustrated, and/or certain described steps may be skipped or not performed altogether.

At block 202, the HDR and/or SDR imagery content 54 may be received. By way of example, the perceptual point tone mapping service 72 located at the broadcaster system 86 may receive the HDR imagery content from one or more content providers.

At block 204, the perceptual point tone mapping service 72 may determine whether the HDR and/or SDR imagery content 54 requires broadcaster side adjustment. In some embodiments, the requirement for broadcaster side adjustment may be pre-determined (e.g., programmed) and retrievable from the memory 74 of the perceptual point tone mapping service 72. Additionally, or alternatively, determining the requirement for broadcaster side adjustment may include a user input, for example, a request to adjust the HDR imagery content received by the broadcaster system 86. In some embodiments, the perceptual point tone mapping service 72 may determine whether the HDR and/or SDR imagery content 54 requires broadcaster side adjustment within the broadcaster system 86 and/or independent of (e.g., separate from) the broadcaster system 86.

If the HDR and/or SDR imagery content 54 does not require broadcaster side adjustment, the method proceeds to block 206. At block 206, the HDR and/or SDR imagery content 54 may be transmitted to the media viewing device 56 by the communication channels 80 of the network 78. If the HDR and/or SDR imagery content 54 does require broadcaster side adjustment, the method proceeds to block 208. At block 208, the defined perceptual point parameters

52 are received. In some embodiments, one or more of the defined perceptual point parameters 52 may be pre-determined (e.g., programmed) and retrievable from the memory 74 of the perceptual point tone mapping service 72. Additionally, or alternatively, one or more defined perceptual point parameters 52 may be received by a user input, for example, the defined perceptual point parameters 52 are inputted by a user of the broadcaster system 86. In some embodiments, the one or more defined perceptual point parameters 52 may be received in combination with the HDR and/or SDR imagery content 54 received from the one or more content providers.

At block 210, the HDR and/or SDR imagery content 54 may be adjusted (e.g., normalized), by the tone mapping techniques discussed herein, using the one or more defined perceptual point parameters 52 to produce the adjusted HDR and/or SDR imagery content 82.

At block 206, the adjusted HDR and/or SDR imagery content 82 may be transmitted to the media viewing device 56 by the communication channels 80 of the network 78.

At block 212, the perceptual point tone mapping service 72 may determine whether the HDR and/or SDR imagery content 54 or the adjusted HDR and/or SDR imagery content 82 requires display side adjustment. In some embodiments, the requirement for the display side adjustment may be pre-determined (e.g., programmed) by the manufacturer of the media viewing device 56 and retrievable from the memory 74 of the perceptual point tone mapping service 72 and/or from the memory of the media viewing device 56. Additionally, or alternatively, determining the requirement for the display side adjustment may include a user input, for example, a request to adjust the HDR imagery content received by the media viewing device 56. In some embodiments, the requirement to adjust the HDR and/or SDR imagery content 54 or the adjusted HDR and/or SDR imagery content 82 may be determined by the broadcaster system 86 and/or the independent perceptual point tone mapping service 72 and transmitted along with the HDR and/or SDR imagery content 54 or the adjusted HDR and/or SDR imagery content 82 to the media viewing device 56. For example, the one or more defined perceptual point parameters 52 may be embedded in the HDR and/or SDR imagery content 54 signal (e.g., metadata, SMPTE ST 2108, AVC|HEVC SEI messages) during distribution to customers and/or international distribution facilities. Additionally, the one or more defined perceptual point parameters 52 may be incorporated into the file wrapper for the HDR and/or SDR imagery content 54, for example, by the content creator and/or provider.

If the HDR and/or SDR imagery content 54 or the adjusted HDR and/or SDR imagery content 82 does not require the display side adjustment, the method proceeds to block 214. At block 214, the HDR and/or SDR imagery content 54 or the adjusted HDR and/or SDR imagery content 82 may be transmitted to and presented by the display 84 of the media viewing device 56. As a result, the HDR and/or SDR imagery content 54 or the adjusted HDR and/or SDR imagery content 82 may correspond to the displayed image 70 observable by a viewer of the media viewing device 56. If the HDR and/or SDR imagery content 54 or the adjusted HDR and/or SDR imagery content 82 does require the display side adjustment, the method proceeds to block 216.

At block 216, the defined perceptual point parameters 52 and/or the additional defined perceptual point parameters 88 are received. In some embodiments, one or more of the defined perceptual point parameters 52 and/or the additional defined perceptual point parameters 88 may be pre-determined (e.g., programmed) by the manufacturer of the media viewing device 56 and retrievable from the memory 74 of the perceptual point tone mapping service 72 and/or from the memory of the media viewing device 56. Additionally, or alternatively, one or more of the defined perceptual point parameters 52 and/or one or more of the additional defined perceptual point parameters 88 may be received by a user input, for example, the one or more defined perceptual point parameters 52 and/or the one or more additional defined perceptual point parameters 88 are inputted by a user of the media viewing device 56. In some aspects, the one or more defined perceptual point parameters 52 and/or the one or more additional defined perceptual point parameters 88 may be received in combination with the HDR and/or SDR imagery content 54 or the adjusted HDR and/or SDR imagery content 82 received from the broadcaster system 86 and/or the independent perceptual point tone mapping service 72. Additionally, as further discussed in FIG. 7, one or more of the defined perceptual point parameters 52 and/or one or more of the additional defined perceptual point parameters 88 may contain an indication of permissions. Further, the indication of permissions may determine whether a downstream component (e.g., the media viewing device 56) of the perceptual point tone mapping service 72 is permitted to adjust particular ones of the one or more of the defined perceptual point parameters 52 and/or one or more of the additional defined perceptual point parameters 88.

At block 218, the HDR and/or SDR imagery content 54 or the adjusted HDR and/or SDR imagery content 82 may be adjusted (e.g., normalized), by the tone mapping techniques discussed herein, using the one or more defined perceptual point parameters 52 and/or the one or more additional defined perceptual point parameters 88 to produce the adjusted HDR and/or SDR imagery content 82 and/or the additionally adjusted HDR and/or SDR imagery content 90. Proceeding to block 214, the adjusted or additionally adjusted HDR and/or SDR imagery content 82, 90 may be transmitted to and presented by the display 84 of the media viewing device 56. As a result, the adjusted or additionally adjusted HDR and/or SDR imagery content 82, 90 may correspond to the displayed image 70 observable by a viewer of the media viewing device 56.

Figure 7:
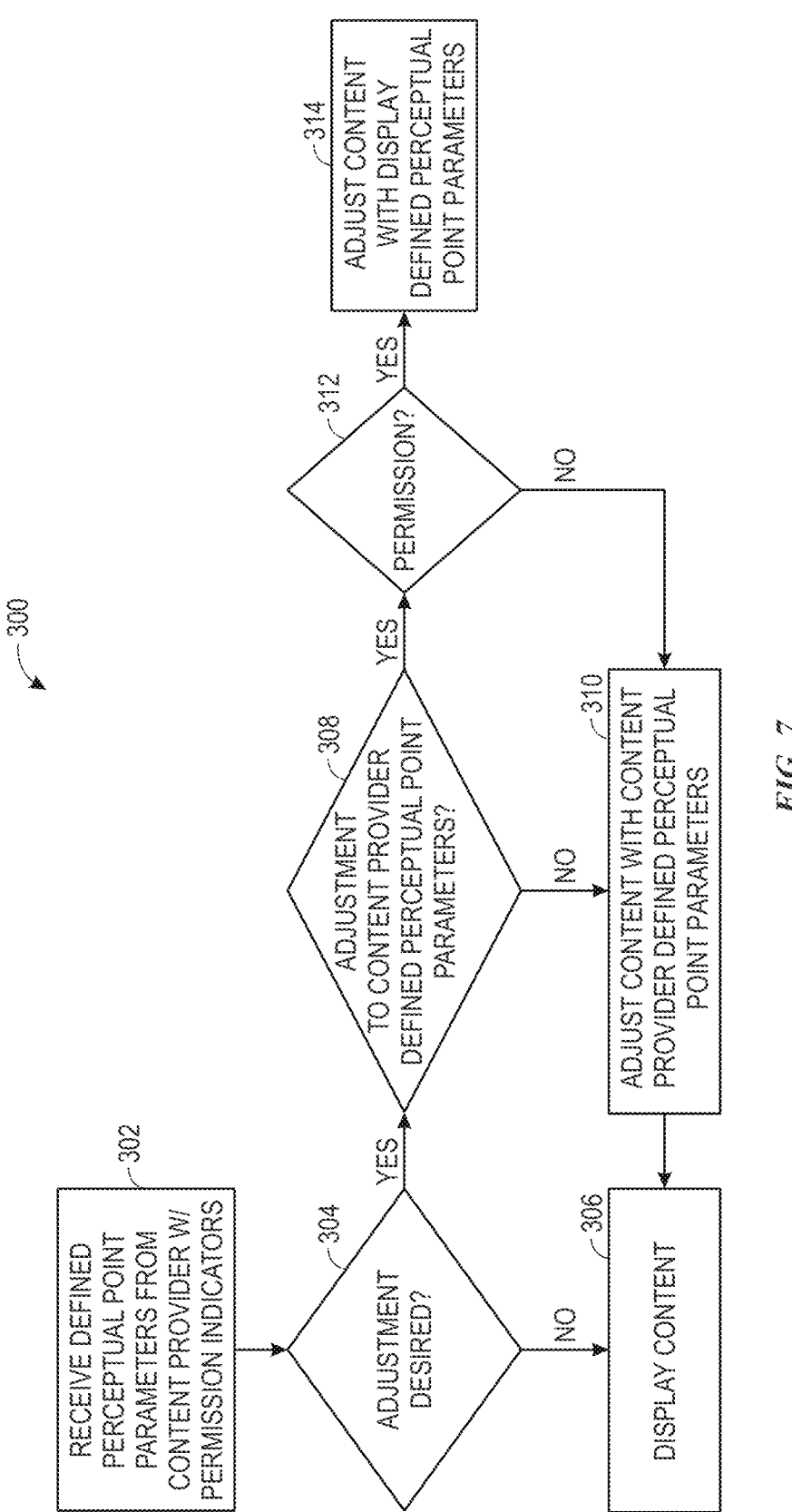
FIG. 7 is a flow diagram, illustrating a process for adjusting HDR or SDR imagery content that includes permissions using the perceptual point tone mapping system of FIG. 1, in accordance with one or more current embodiments.

FIG. 7 is a flow diagram, illustrating a process or method 300 for adjusting HDR or SDR imagery content that includes permissions using the perceptual point tone mapping system 50. Any suitable device (e.g., the processing circuitry 76 of the perceptual point tone mapping service 72) may perform the method 300. In an aspect, the method 300 may be implemented by executing instructions stored in a tangible, non-transitory, computer-readable medium (e.g., the memory 74 of the perceptual point tone mapping service 72). For example, the method 300 may be performed at least in part by one or more software components, one or more hardware components, one or more software applications, and the like. While the method 300 is described using steps in a specific sequence, additional steps may be performed, the described steps may be performed in different sequences than the sequence illustrated, and/or certain described steps may be skipped or not performed altogether.

At block 302, the defined perceptual point parameters 52 are received by the downstream component (e.g., the media viewing device 56) of the perceptual point tone mapping service 72. In some aspects, one or more of the defined perceptual point parameters 52 may be pre-determined (e.g., programmed) by the manufacturer of the media viewing device 56 and retrievable from the memory 74 of the perceptual point tone mapping service 72 and/or from the memory of the media viewing device 56. In some aspects, the one or more defined perceptual point parameters 52 may be received in combination with the HDR and/or SDR imagery content 54 or the adjusted HDR and/or SDR imagery content 82 received from the broadcaster system 86 and/or the independent perceptual point tone mapping service 72. Additionally, the one or more defined perceptual point parameters 52 may contain an indication of permissions. Alternatively, the indication of permissions may be received by the downstream component along with the one or more defined perceptual point parameters 52. The permissions may indicate whether the downstream component, for example the media viewing device 56, is permitted to adjust particular ones of the one or more of the defined perceptual point parameters 52 of the HDR and/or SDR imagery content 54.

At block 304, the perceptual point tone mapping service 72 may determine whether the HDR and/or SDR imagery content 54 or the adjusted HDR and/or SDR imagery content 82 requires adjustment at the downstream component. In some embodiments, the requirement for the downstream side adjustment may be pre-determined (e.g., programmed) by the manufacturer of the media viewing device 56 and retrievable from the memory 74 of the perceptual point tone mapping service 72 and/or from the memory of the media viewing device 56. Additionally, or alternatively, determining the requirement for the downstream side adjustment may include a user input, for example, a request to adjust the HDR imagery content received by the media viewing device 56. In some aspects, the requirement to adjust the HDR and/or SDR imagery content 54 or the adjusted HDR and/or SDR imagery content 82 may be determined by the broadcaster system 86 and/or the independent perceptual point tone mapping service 72 and transmitted along with the HDR and/or SDR imagery content 54 or the adjusted HDR and/or SDR imagery content 82 to the media viewing device 56.

If the HDR and/or SDR imagery content 54 or the adjusted HDR and/or SDR imagery content 82 does not require the downstream side adjustment, the method proceeds to block 306. At block 306, the HDR and/or SDR imagery content 54 or the adjusted HDR and/or SDR imagery content 82 may be transmitted to and presented by the display 84 of the media viewing device 56. As a result, the HDR and/or SDR imagery content 54 or the adjusted HDR and/or SDR imagery content 82 may correspond to the displayed image 70 observable by a viewer of the media viewing device 56. If the HDR and/or SDR imagery content 54 or the adjusted HDR and/or SDR imagery content 82 does require the display side adjustment, the method proceeds to block 308.

At block 308, the perceptual point tone mapping service 72 may determine whether the one or more of the defined perceptual point parameters 52 received by the downstream component requires alteration (e.g., changed, increased, decreased) prior to adjusting the HDR and/or SDR imagery content 54 or the adjusted HDR and/or SDR imagery content 82. The need or requirement to alter the one or more of the defined perceptual point parameters 52 may be pre-determined (e.g., programmed) by the manufacturer of the media viewing device 56 and retrievable from the memory 74 of the perceptual point tone mapping service 72 and/or from the memory of the media viewing device 56. Additionally, or alternatively, determining whether to alter the one or more of the defined perceptual point parameters 52 may be based on user input, such as a request to alter the one or more of the defined perceptual point parameters 52 received by the media viewing device 56. In some aspects, the requirement to alter the one or more of the defined perceptual point parameters 52 may be determined by the broadcaster system 86 and/or the independent perceptual point tone mapping service 72 and transmitted along with the HDR and/or SDR imagery content 54 or the adjusted HDR and/or SDR imagery content 82, and the one or more of the defined perceptual point parameters 52 to the media viewing device 56.

If the one or more of the defined perceptual point parameters 52 do not require alteration prior to adjusting the HDR and/or SDR imagery content 54 or the adjusted HDR and/or SDR imagery content 82, the method proceeds to block 310. At block 310, the HDR and/or SDR imagery content 54 or the adjusted HDR and/or SDR imagery content 82 may be adjusted to produce the adjusted or additionally adjusted HDR and/or SDR imagery content 82, 90 using the one or more of the defined perceptual point parameters 52 received by the downstream component. In some aspects, at block 310, the downstream component may also adjust the HDR and/or SDR imagery content 54 or the adjusted HDR and/or SDR imagery content 82 using the additional defined perceptual point parameters 88 to produce the adjusted or additionally adjusted HDR and/or SDR imagery content 82, 90. The method then proceeds to 306, and similarly as discussed herein, the adjusted or additionally adjusted HDR and/or SDR imagery content 82, 90 may be transmitted to and presented by the display 84 of the media viewing device 56. As a result, the adjusted or additionally adjusted HDR and/or SDR imagery content 82, 90 may correspond to the displayed image 70 observable by a viewer of the media viewing device 56. If the one or more of the defined perceptual point parameters 52 do require alteration prior to adjusting the HDR and/or SDR imagery content 54 or the adjusted HDR and/or SDR imagery content 82, the method proceeds to block 312.

At block 312, the perceptual point tone mapping service 72 may determine whether the downstream component has permission to alter the one or more of the defined perceptual point parameters 52. The one or more of the defined perceptual point parameters 52 may contain the indication of permissions that identifies the particular ones of the one or more of the defined perceptual point parameters 52 that the downstream component may alter. The indication of permissions may be transmitted by the content provider and/or the broadcaster system 86 along with (or separate from) the one or more of the defined perceptual point parameters 52 and/or the HDR and/or SDR imagery content 54 and/or the adjusted HDR and/or SDR imagery content 82. Further, the downstream component may receive the indication of permissions and may determine (e.g., via the processing circuitry 76 of the perceptual point tone mapping service 72) whether the downstream component is permitted by the indication of permissions to alter the one or more of the defined perceptual point parameters 52. If the downstream component is not permitted to alter the one or more of the defined perceptual point parameters 52, the method proceeds to block 310 and then to block 306, as discussed herein. However, if the downstream component is permitted by the indication of permissions to alter at least one of the one or more of the defined perceptual point parameters 52, the method proceeds to block 314.

At block 314, the perceptual point tone mapping service 72 alters the at least one of the one or more of the defined perceptual point parameters 52 and adjusts the HDR and/or SDR imagery content 54 or the adjusted HDR and/or SDR imagery content 82 based on the altered at least one of the one or more of the defined perceptual point parameters 52, any remaining unaltered one or more of the defined perceptual point parameters 52, and/or the additional defined perceptual point parameters 88 to produce the adjusted or additionally adjusted HDR and/or SDR imagery content 82, 90. The method then proceeds to block 306, as discussed therein.

As an example, the perceptual point tone mapping service 72 of the media viewing device 56 may receive HDR imagery content along with the one or more of the defined perceptual point parameters 52 from a content provider. The defined perceptual point parameters 52 may include the gamma adjustment point 58, the graphic white anchor 62, and the peak white anchor 64. The perceptual point tone mapping service 72 of the media viewing device 56 may then determine that the HDR imagery content exceeds the display capabilities of the media viewing device 56 and requires adjustment by the perceptual point tone mapping service 72 of the media viewing device 56. Additionally, or alternatively, the perceptual point tone mapping service 72 of the media viewing device 56 may receive a request to adjust the HDR imagery content using the defined perceptual point parameters 52 from the content provider. Further, the media viewing device 56 may additionally receive a user input indicating a particular gamma adjustment point 58 and a particular peak white anchor 64 to adjust the HDR imagery content. The perceptual point tone mapping service 72 may then determine if the media viewing device 56 has permission to alter the gamma adjustment point 58 and the peak white anchor 64 received from the content provider. If the media viewing device 56 is permitted to alter the gamma adjustment point 58 and/or the peak white anchor 64, the perceptual point tone mapping service 72 may then alter the respective permitted defined perceptual point parameters 52 to the desired value indicated by the user.

As in this example, the indication of permission identifies that the media viewing device 56 is not permitted to alter the gamma adjustment point 58, however, the media viewing device 56 is permitted to alter the peak white anchor 64. The perceptual point tone mapping service 72 of the media viewing device 56 may then alter the peak white anchor 64 to a value indicated by the user, and adjust the HDR imagery content using the altered peak white anchor 64 determined by the user of the media viewing device 56 and the gamma adjustment point 58 and the graphic white anchor 62 received from the content provider. Additionally, the perceptual point tone mapping service 72 of the media viewing device 56 may adjust the HDR imagery content using the additional defined perceptual point parameters 88 discussed herein, such as the one or more variable compression points 66 with in the highlight region 68. As a result, the adjusted or additionally adjusted HDR and/or SDR imagery content 82, 90 is produced and subsequently displayed as the displayed image 70 by the media viewing device 56. In this way, the user and/or the content provider have sufficient control over the intended look of the displayed image 70. In addition, the HDR imagery content received by the media viewing device 56 may be selectively and dynamically compressed by the perceptual point tone mapping service 72 to enable compatibility with the display capabilities while preserving the intended look of the displayed image 70 presented to the user.

While method 300 describes permissions in terms of permissions to edit perception point/anchor point values at an "edit"/"no edit" granularity, the current discussion is not intended to limit the method 300 to such permissions.

Indeed, the permissions could refer to permissions that allow perception point/anchor point values to be edited within a range of values, such as allowing a gamma adjustment perception point to be set to a value between 50-100 nits, allow the graphic white perception point value to be set to one of 203 or 260 nits, etc. In such a case, any adjustments outside of the permitted ranges/values would not be permitted and the default provided by the broadcast would be used and/or a different value that is permitted could be submitted.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A perceptual point tone mapping system comprising:
a perceptual point tone mapping circuitry configured to:
  receive imagery content;
  receive a plurality of predefined perceptual point parameters, wherein the plurality of predefined perceptual point parameters comprises a first white reference value, a peak white reference value, and a variable compression point associated with the imagery content;
  adjust the imagery content using the plurality of predefined perceptual point parameters to produce adjusted imagery content; and
  provide the adjusted imagery content for display by a media viewing device.

2. The perceptual point tone mapping system of claim 1, wherein the perceptual point tone mapping circuitry is configured to adjust the imagery content by compressing a first portion of luminance values associated with the imagery content that is above the first white reference value and is below the variable compression point at a first compression rate, and by compressing a second portion of the luminance values that is above the variable compression point and is below the peak white reference value at a second compression rate greater than the first compression rate.

3. The perceptual point tone mapping system of claim 2, wherein the imagery content comprises high dynamic range (HDR) content, standard dynamic range (SDR) content, or both.

4. The perceptual point tone mapping system of claim 2, wherein the plurality of predefined perceptual point parameters comprises an additional variable compression point, and wherein the perceptual point tone mapping circuitry is configured to adjust the imagery content by compressing a third portion of the luminance values that is above the additional variable compression point and is below the peak white reference value at a third compression rate greater than the second compression rate.

5. The perceptual point tone mapping system of claim 1, wherein the plurality of predefined perceptual point parameters comprises a gamma adjustment point; and
  wherein the perceptual point tone mapping circuitry is configured to adjust the imagery content by applying a gamma curve to the imagery content based upon the gamma adjustment point.

6. The perceptual point tone mapping system of claim 1, wherein the first white reference value comprises a graphic white reference value.

7. The perceptual point tone mapping system of claim 6, wherein the graphic white reference value comprises a first graphic white reference value when the adjusted imagery content is to be provided to a first media viewing device in a first destination; and
  wherein the graphic white reference value comprises a second graphic white reference value different than the first graphic white reference value when the adjusted imagery content is to be provided to a second media viewing device in a second destination different than the first destination.

8. The perceptual point tone mapping system of claim 7, wherein the first graphic white reference value comprises 260 nits.

9. The perceptual point tone mapping system of claim 7, wherein the second graphic white reference value comprises 203 nits.

10. The perceptual point tone mapping system of claim 1, further comprising a broadcaster system configured to transmit the adjusted imagery content to the media viewing device, wherein at least a portion of the perceptual point tone mapping circuitry is implemented within the broadcaster system.

11. The perceptual point tone mapping system of claim 10, wherein the broadcaster system is configured to provide an indication of permissions indicating whether a downstream component is permitted to adjust particular ones of the plurality of predefined perceptual point parameters, specific luminance values, ranges of luminance values, or both that may be set for the particular ones of the plurality of predefined perceptual point parameters, or both.

12. The perceptual point tone mapping system of claim 1, further comprising the media viewing device configured to receive the imagery content, the adjusted imagery content, or both, wherein at least a portion of the perceptual point tone mapping circuitry is implemented within the media viewing device.

13. A computer-implemented method, comprising:
  receiving imagery content;
  receiving a plurality of predefined perceptual point parameters, wherein the plurality of predefined perceptual point parameters comprises a first white reference value, a peak white reference value, and a variable compression point associated with the imagery content;
  adjusting the imagery content using the plurality of predefined perceptual point parameters to produce adjusted imagery content; and
  providing the adjusted imagery content for display by a media viewing device.

14. The computer-implemented method of claim 13, wherein the computer-implemented method is configured to adjust the imagery content by compressing a first portion of luminance values associated with the imagery content that is above the first white reference value and is below the variable compression point at a first compression rate, and by compressing a second portion of the luminance values that is above the variable compression point and is below the peak white reference value at a second compression rate greater than the first compression rate.

15. The computer-implemented method of claim 14, wherein the plurality of predefined perceptual point parameters comprises an additional variable compression point, and wherein the computer-implemented method is configured to adjust the imagery content by compressing a third portion of the luminance values that is above the additional variable compression point and is below the peak white reference value at a third compression rate greater than the second compression rate; and wherein the variable compression point and the additional variable compression point are greater than the first white reference value.

16. The computer-implemented method of claim 13, wherein the imagery content comprises high dynamic range (HDR) content, standard dynamic range (SDR) content, or both.

17. The computer-implemented method of claim 13, further comprising:

receiving an indication of permissions indicating whether a downstream component is permitted to adjust particular ones of the plurality of predefined perceptual point parameters; and adjusting the imagery content in accordance with the permissions by adjusting only at least a portion of the permitted particular ones of the plurality of predefined perceptual point parameters to produce adjusted imagery content.

18. A tangible, non-transitory, computer-readable medium, comprising computer readable instructions that, when executed by one or more processors of one or more computers, cause the one or more computers to:

receive imagery content, wherein the imagery content comprises high dynamic range (HDR) content, standard dynamic range (SDR) content, or both;

receive a plurality of predefined perceptual point parameters, wherein the plurality of predefined perceptual point parameters comprises a first white reference value, a peak white reference value, and a variable compression point associated with the imagery content;

adjust the imagery content using the plurality of predefined perceptual point parameters to produce adjusted imagery content; and provide the adjusted imagery content for display by a media viewing device.

19. The tangible, non-transitory, computer-readable medium of claim 18, wherein the one or more computers are configured to adjust the imagery content by compressing a first portion of luminance values associated with the imagery content that is above the first white reference value and is below than the variable compression point at a first compression rate, and by compressing a second portion of the luminance values that is above the variable compression point and is below the peak white reference value at a second compression rate greater than the first compression rate.

20. The tangible, non-transitory, computer-readable medium of claim 19, wherein the plurality of predefined perceptual point parameters comprises an additional variable compression point, and wherein the one or more computers are configured to adjust the imagery content by compressing a third portion of the luminance values that is above the additional variable compression point and is below the peak white reference value at a third compression rate greater than the second compression rate; and wherein the variable compression point and the additional variable compression point are greater than the first white reference value.

* * * * *